United States Patent
Smith

(10) Patent No.: US 10,260,608 B2
(45) Date of Patent: Apr. 16, 2019

(54) HUB ASSEMBLY FOR A TORQUE CONVERTER AND RELATED METHOD

(71) Applicant: Schaeffler Technologies AG & Co. KG, Herzogenaurach (DE)

(72) Inventor: Matthew Smith, Wooster, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 749 days.

(21) Appl. No.: 14/684,116

(22) Filed: Apr. 10, 2015

(65) Prior Publication Data
US 2015/0300473 A1    Oct. 22, 2015

Related U.S. Application Data

(60) Provisional application No. 61/980,969, filed on Apr. 17, 2014.

(51) Int. Cl.
| F16H 45/02 | (2006.01) |
| F16H 41/24 | (2006.01) |
| F16H 41/28 | (2006.01) |

(52) U.S. Cl.
CPC ............ *F16H 41/24* (2013.01); *F16H 41/28* (2013.01); *F16H 2045/021* (2013.01); *F16H 2045/0215* (2013.01); *F16H 2045/0294* (2013.01)

(58) Field of Classification Search
CPC .......................... F16H 41/28; F16H 2045/0215
See application file for complete search history.

(56) References Cited

U.S. PATENT DOCUMENTS

| 2007/0235277 A1* | 10/2007 | Heuler ............... F16D 25/0638 192/3.3 |
| 2008/0121483 A1* | 5/2008 | Sasse .................... F16H 45/02 192/3.3 |
| 2011/0132709 A1 | 6/2011 | Fukunaga et al. |
| 2011/0233019 A1* | 9/2011 | Ohashi ............... F16D 25/0638 192/3.26 |
| 2013/0146412 A1* | 6/2013 | Takeshima ............ F16H 45/02 192/3.29 |
| 2013/0224002 A1 | 8/2013 | Ito et al. |

FOREIGN PATENT DOCUMENTS

| JP | 2003-322239 | 11/2003 |
| JP | 2013-072552 A | 4/2013 |
| KR | 10-2011-0052201 A | 5/2011 |

OTHER PUBLICATIONS

International Search Report for corresponding International Application PCT/US2015/025459.

* cited by examiner

*Primary Examiner* — F Daniel Lopez
(74) *Attorney, Agent, or Firm* — Davidson, Davidson & Kappel, LLC

(57) ABSTRACT

A hub assembly for a torque converter is provided. The hub assembly includes a turbine hub including an inner radial surface, an outer radial surface and a channel for providing fluid from the inner radial surface to the outer radial surface. The turbine hub also includes a first seal and a second seal on the outer radial surface and a plenum groove in the outer radial surface axially between the first seal and the second seal. The channel extends radially into the plenum groove. A method for forming a hub assembly for a torque converter is also provided.

15 Claims, 4 Drawing Sheets

US 10,260,608 B2

1

HUB ASSEMBLY FOR A TORQUE CONVERTER AND RELATED METHOD

This claims the benefit to U.S. Provisional Patent Application No. 61/980,969, filed on Apr. 17, 2014, which is hereby incorporated by reference herein.

The present disclosure relates generally to torque converters for motor vehicle drive trains and more specifically to hub assemblies for torque converters.

BACKGROUND

FIG. 1 shows a cross-sectional side view of a torque converter 10 including a conventional hub assembly 12. Hub assembly 12 includes a hub 14 fixed to a turbine shell 16. Hub 14 includes two seals 18, 20 on the outer radial surface 22 thereof for contacting a further hub 24, which is fixed to a front cover 26 of torque converter 10 and is rotatable independently of hub 14 when piston 28 is not clamping clutch plate 30 against front cover 26 to engage lock-up clutch 32. Hub 14 includes a channel 34 supplying fluid to a region 36 formed radially between hubs 14, 24 and sealed axially by seals 18, 20.

A lock-up pressure fluid is applied through the center of a transmission input shaft into hub 14. The fluid then crosses a back pressure chamber flow path before reaching piston 28. The back pressure flow path is isolated from both a torque converter charge pressure and an apply pressure by seals 18, 20 between hubs 14, 24. The flow paths in these hubs cause a delay and pressure loss/bump as piston 28 is being engaged. When piston 28 is engaged, the apply chamber pressure increases, causing a pressure difference between the apply chamber and the back pressure chamber applying clutch 32 with a force relative to the differential pressure. As piston 28 moves towards the back pressure chamber, the back pressure chamber reduces in size and attempts to evacuate fluid without a buildup of pressure to ensure maximum controllability of differential pressure across the piston for increased clutch controllability. Flow is choked in the cross over interface causing back pressure in piston 28 and delayed clutch response time.

SUMMARY OF THE INVENTION

A hub assembly for a torque converter is provided. The hub assembly includes a turbine hub including an inner radial surface, an outer radial surface and a channel for providing fluid from the inner radial surface to the outer radial surface. The turbine hub also includes a first seal and a second seal on the outer radial surface and a plenum groove in the outer radial surface axially between the first seal and the second seal. The channel extends radially into the plenum groove.

A method for forming a hub assembly for a torque converter is also provided. The method includes forming a plenum groove in an outer radial surface of a turbine hub and forming a channel in the turbine hub extending radially from an inner radial surface of the turbine hub to the outer radial surface. The channel is axially aligned with the plenum groove.

BRIEF DESCRIPTION OF THE DRAWINGS

The present invention is described below by reference to the following drawings, in which.

2

Figure 1:
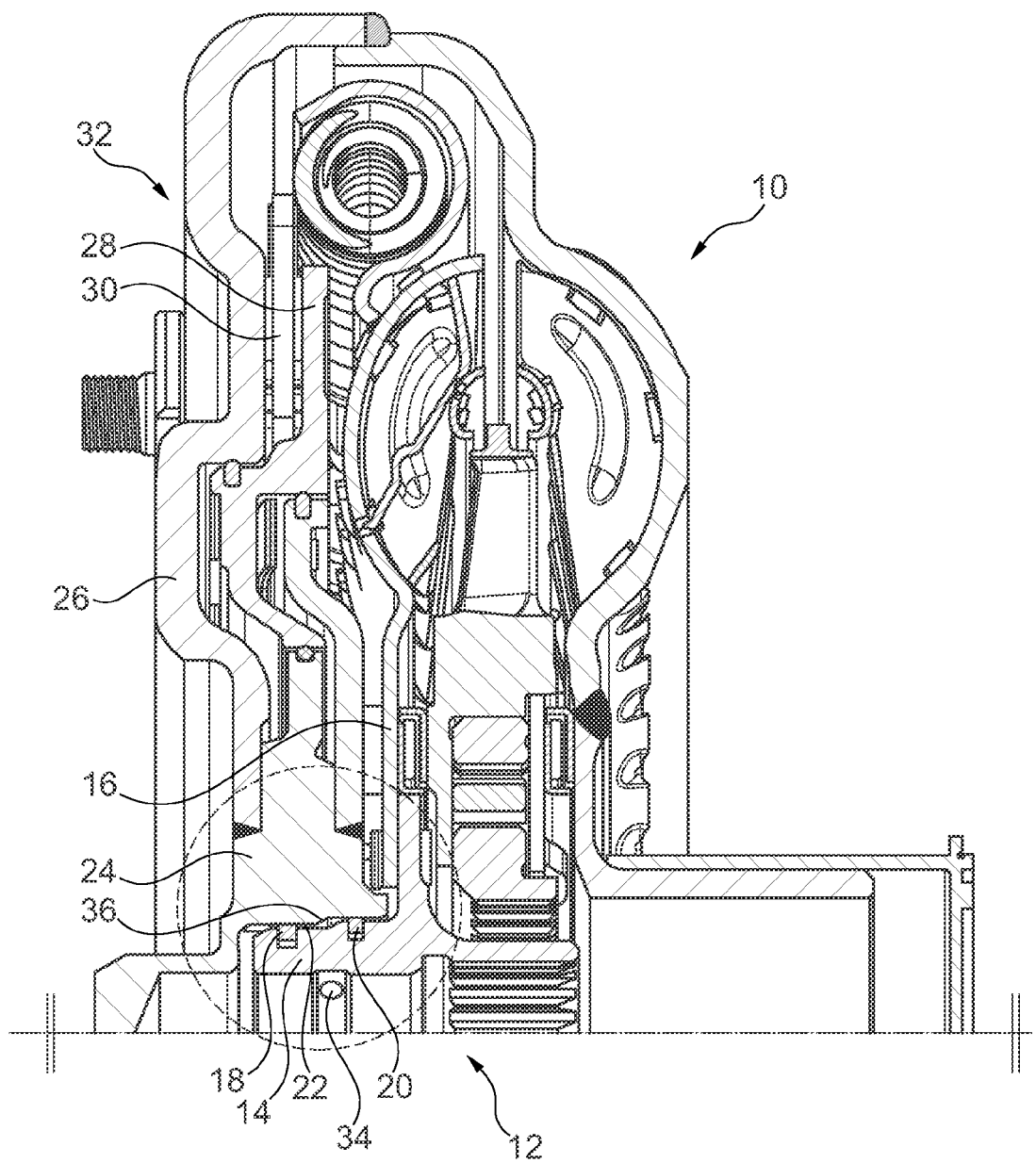
FIG. 1 shows a torque converter including a conventional hub assembly.
Figure 2:
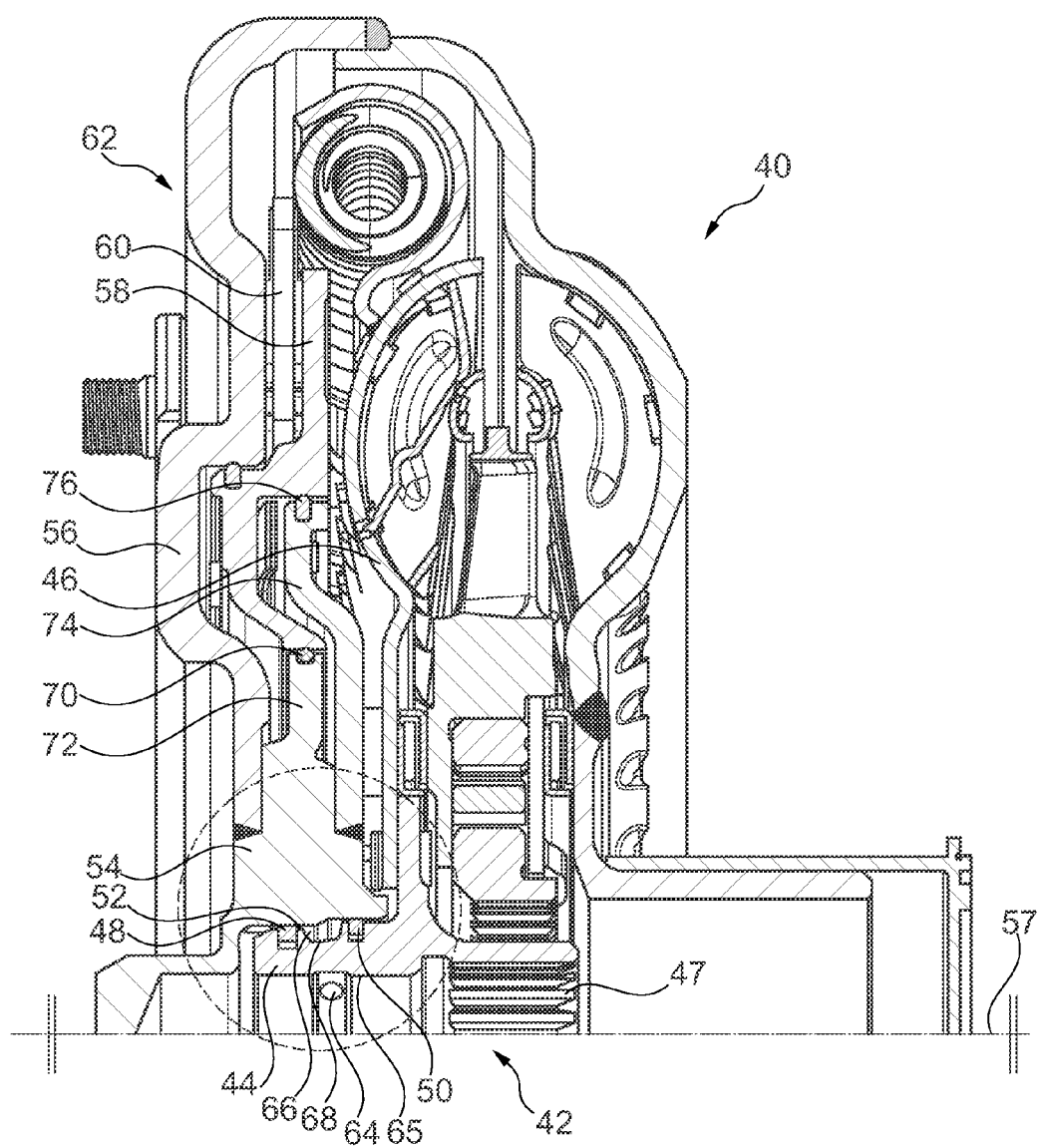
Figure 3:
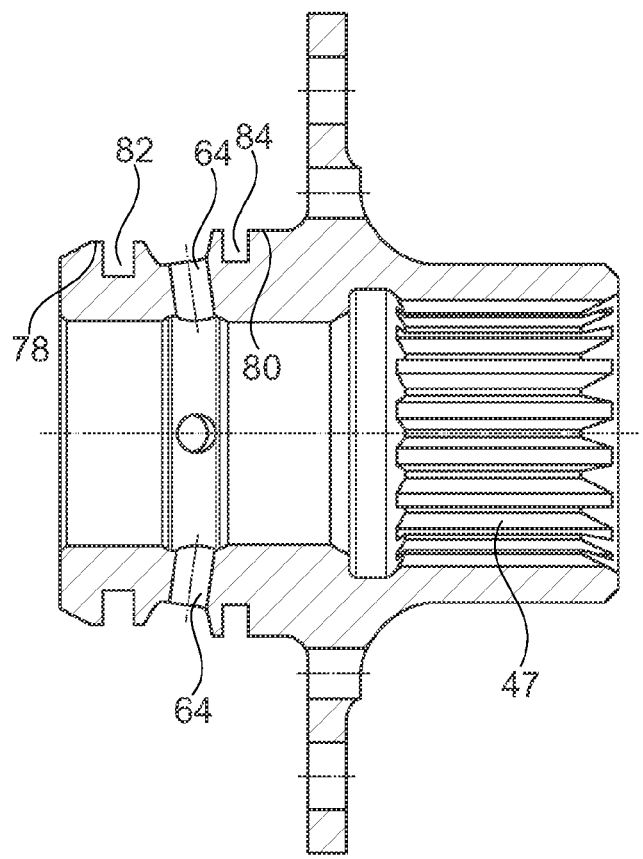
Figure 4:
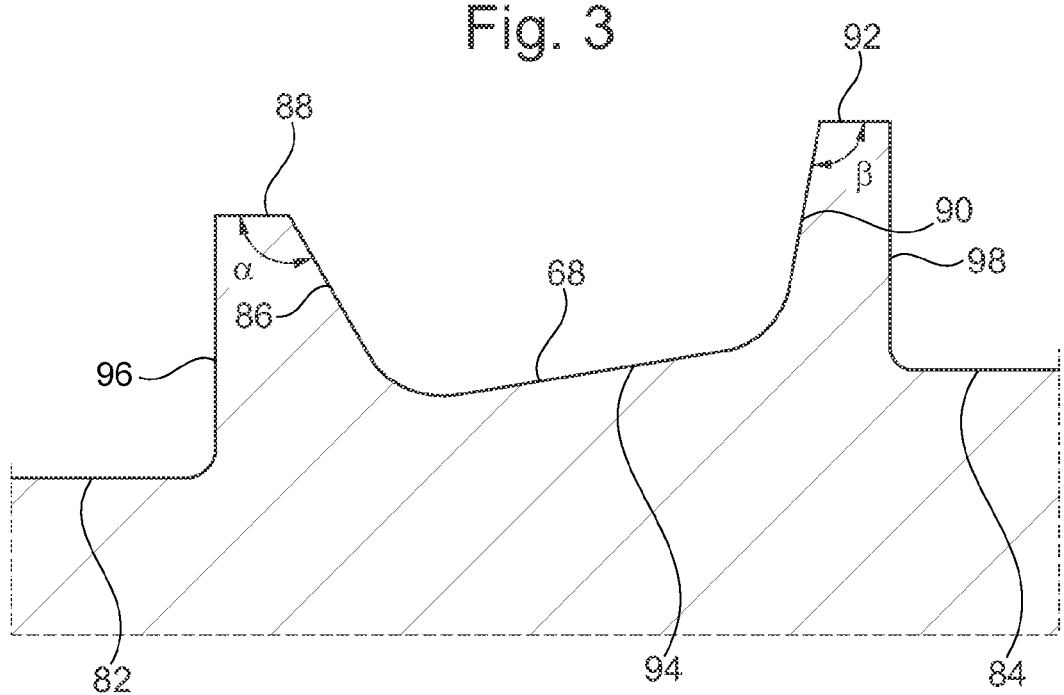
Figure 5:
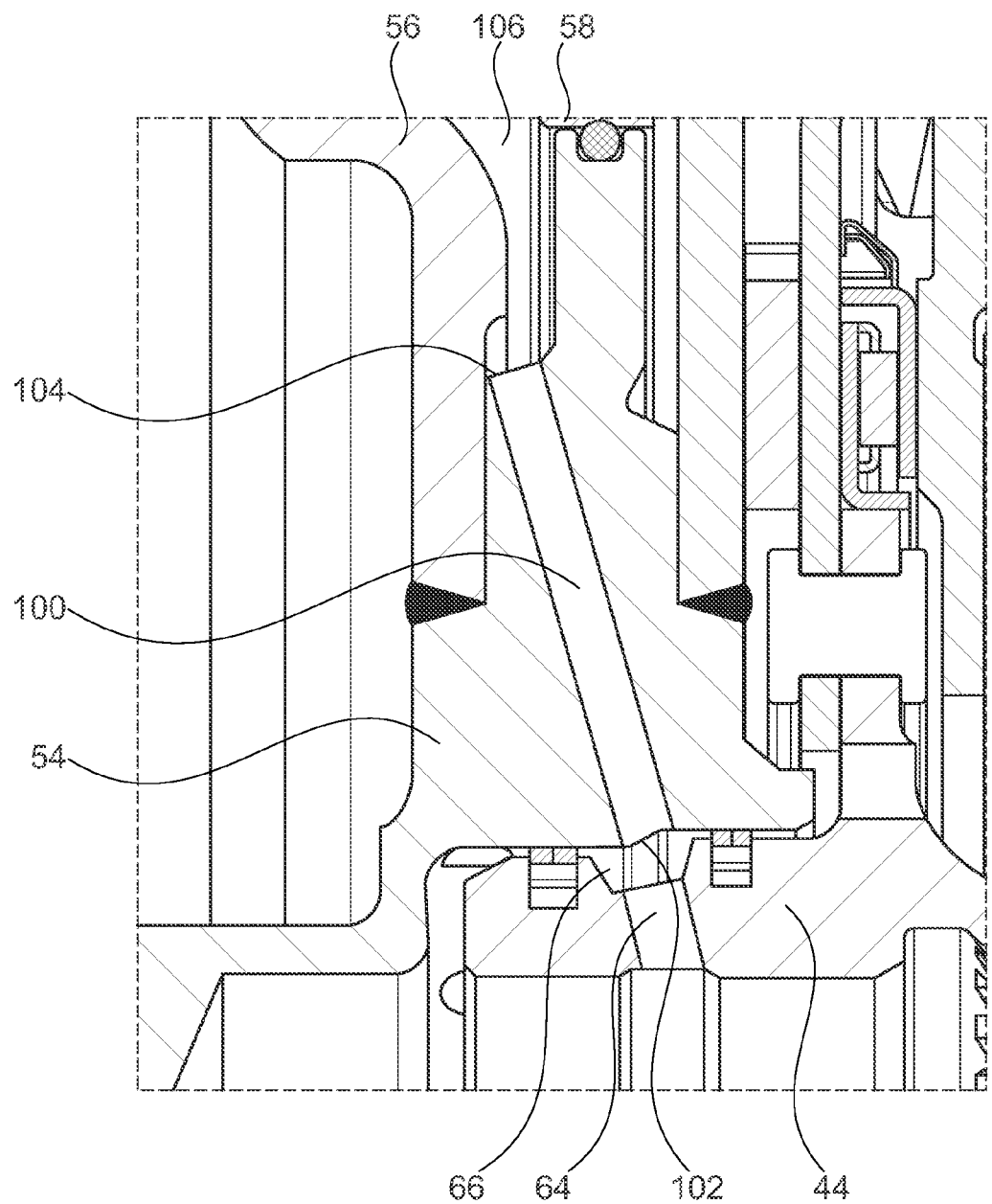

FIG. 2 shows a torque converter including a hub assembly in accordance with an embodiment of the present invention;

FIG. 3 shows an enlarged cross-sectional side view of a hub of the torque converter shown in FIG. 2 along a different plane from that shown in FIG. 2;

FIG. 4 shows an enlarged cross-sectional side view of the hub at a plenum groove formed in the hub along the same plane as shown in FIG. 2; and FIG. 5 shows an enlarged cross-sectional side view of a portion of torque converter along the same plane as shown in FIG. 3.

DETAILED DESCRIPTION

The present disclosure provides a cross-drilled hub with a circumferential plenum groove between two seals. The groove provides a chamber for receiving oil during a switch from a release to apply state of a clutch or vice versa, during a switch from an apply to release stated of a clutch, and easily evacuating oil from a cover hub oil channel to a damper hub oil channel without restriction. The increase in controllability of a lock-up clutch due to the plenum groove allows a significant advantage in the clutch controllability of the transmission.

FIG. 2 shows a cross-sectional side view of a torque converter 40 including a hub assembly 42 in accordance with an embodiment of the present invention. Hub assembly 42 includes a hub 44 fixed to a turbine shell 46. Hub 44 is hollow and includes an inner splined surface 47 for non-rotatably connecting hub 44 to an outer splined surface of a transmission input shaft. Hub 44 includes two seals 48, 50 on the outer radial surface 52 thereof for contacting a further hub 54, which is fixed to a front cover 56 of torque converter 40 and is rotatable independently of hub 44 about an axis 57 when piston 58 is not clamping clutch plate 60 against front cover 56 to engage a lock-up clutch 62. Hub 54 is concentrically outside of hub 44 and axially slidingly supports a radial inner end of piston 58 via a seal 70 formed on a first radially extending flange 72 thereof. Hub 54 is further fixed to a second radially extending flange 74, which axially slidingly supports an inner radial surface of an axial extending portion of piston 58 via a seal 76 formed on an outer radial end of second radially extending flange 74.

Hub 44 includes at least one radially extending channel 64 formed therein extending from an inner radial surface 65 of hub 44 to outer radial surface 52 for providing fluid from inner radial surface 65 to outer radial surface 52. Channel 64 supplies fluid to a chamber region 66 formed radially between hubs 44, 54 and sealed axially by seals 48, 50. Advantageously, hub 44 further includes a circumferentially extending annular plenum groove 68 formed in outer radial surface 52 axially between seals 48, 50. Channel 64 extends radially into plenum groove 68, which opens into chamber region 66. Plenum groove 68 may mitigate flow restrictions and keep back pressure in the sump chamber more consistent, especially at non-relative speeds exhibited during lock and unlock events of clutch 62.

FIG. 3 shows an enlarged cross-sectional side view of hub 44 along a different plane from that shown in FIG. 2. FIG. 4 shows an enlarged cross-sectional side view of hub 44 at plenum 68 along the same plane as shown in FIG. 2. As shown in FIGS. 3 and 4, in this embodiment, outer radial surface 52 of turbine hub 44 includes a first portion 78 having a first radial height and a second portion 80 having a second radial height. Annular plenum groove 68 extends from first portion 78 to second portion 80 at outer radial surface 52. First seal 48 is imbedded in a first seal supporting annular groove 82 formed in first portion 78 and second seal 50 is imbedded in a second seal supporting annular groove 84 formed in second portion 80.

Annular plenum groove 68 is defined by a first plenum groove wall 86 extending radially inward from a first outer surface wall 88 of first portion 78, a second plenum groove wall 90 extending radially inward from a second outer surface wall 92 of second portion 80 and a third plenum groove wall 94, which extends axially and, to a lesser extent, radially to connect first plenum groove wall 86 and second plenum groove wall 90. As shown in FIG. 3, third plenum groove wall 94 is penetrated axially by radially extending channels 64.

In preferred embodiments, third plenum groove wall 94 is angled with respect to channels 64 within approximately 10 degrees of perpendicular (~80 to 100 degrees). Optimizing the highest groove volume/surface area ratio yields the maximum effective groove for the allotted space. As viewed side cross-sectionally, first plenum groove wall 86 forms an obtuse angle α with first outer surface wall 88 and second plenum groove wall 90 form an obtuse angle β with second outer surface wall 92. In this embodiment, obtuse angle α is greater that obtuse angle β. First outer surface wall 88 extends axially from first plenum groove wall 86 to a radially extending groove wall 96 of first seal supporting groove 82 and second outer surface wall 92 extends axially from second plenum groove wall 90 to a radially extending groove wall 98 of second seal supporting groove 84.

FIG. 5 shows an enlarged cross-sectional side view of a portion of torque converter 40 along the same plane as shown in FIG. 3. FIG. 5 shows a channel 100 forming a back pressure chamber flow path extending from an inner radial surface 102 of hub 54 to an outer radial surface 104 of hub 54 to fluidly connect channel 64 in hub 44, via pressure chamber 66, to a back pressure region 106 formed between piston 58 and front cover 56.

Hub assembly 42 may be formed by forming annular plenum groove 68 in outer radial surface 52, preferably by machining channels 64 may be formed in turbine hub 44 to extending radially between inner radial surface 65 and outer radial surface 52, preferably by drilling, such that channels 64 are axially aligned with annular plenum groove 68. First seal groove 82 and second seal groove 84 may be formed in outer radial surface 52, and first seal 48 is then provided in first seal groove 82 and second seal 50 is provided in second seal groove 84. Channels 64, groove 68 and grooves 82, 84 do not necessarily have to be formed in turbine hub 44 in any particular order. After channels 64, groove 68 and grooves 82, 84 are formed, turbine hub 44 is slid into further hub 54 such that seals 48, 50 contact inner radial surface 102 of further hub 54, chamber 66 is formed radially between turbine hub 44 and further hub 54 axially between seals 48, 50, and channel 100 is aligned for fluid communication with channel 64 via chamber 66.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A hub assembly for a torque converter comprising:
a turbine hub including an inner radial surface, an outer radial surface and a channel for providing fluid from the inner radial surface to the outer radial surface, the turbine hub including a first seal and a second seal on the outer radial surface and a plenum groove in the outer radial surface axially between the first seal and the second seal, the channel extending radially into the plenum groove, the plenum groove being defined by a first plenum groove wall extending radially inward from a first outer surface wall, a second plenum groove wall extending radially inward from a second outer surface wall and a third plenum groove wall connecting the first plenum groove wall and the second plenum groove wall by extending axially from the first plenum groove wall to the second plenum groove wall, at least one of the first plenum groove wall and the second plenum groove wall being inclined with respect to a center axis about which the hub assembly is configured to rotate such that the at least one of the first plenum groove wall and the second plenum groove wall extends axially away from the third plenum groove wall, the third plenum groove wall being inclined with respect to the center axis.

2. The hub assembly as recited in claim 1 wherein the turbine hub further includes a radially extending flange for connecting to a turbine shell.

3. The hub assembly as recited in claim 1 wherein the outer radial surface of the turbine hub includes a first portion and a second portion, the first seal being imbedded in a first groove in the first portion, the second seal being imbedded in a second groove in the second portion.

4. The hub assembly as recited in claim 3 wherein the plenum groove extends from the first portion to the second portion of the outer radial surface.

5. The hub assembly as recited in claim 3 wherein the first portion has a first radial height and the second portion has a second radial height greater than the first radial height.

6. The hub assembly as recited in claim 1 further comprising a further hub concentrically outside of the turbine hub, the first seal and second seal contacting an inner radial surface of the further hub.

7. The hub assembly as recited in claim 6 wherein the further hub is configured for fixing to a torque converter front cover.

8. The hub assembly as recited in claim 6 wherein the further hub includes a further hub channel for fluidly connecting with the channel in the turbine hub via a pressure chamber formed radially between the turbine hub and the further hub and axially between the first and second seals.

9. A torque converter comprising:
a turbine; and
the hub assembly as recited in claim 1 fixed to the turbine for transmitting torque from the turbine to a transmission input shaft.

10. The torque converter as recited in claim 9 wherein the hub assembly further comprises a further hub concentrically outside of the turbine hub, the first seal and second seal contacting an inner radial surface of the further hub, the torque converter further comprising a piston axially slidable with respect to the further hub.

11. The torque converter as recited in claim 10 further comprising a front cover, the further hub being fixed to the front cover.

12. The hub assembly as recited in claim 1 wherein both of the first plenum groove wall and the second plenum groove wall are inclined with respect to the center axis such that both the first plenum groove wall and the second plenum groove wall extend axially away from the third plenum groove wall in opposite directions.

13. A method of forming a hub assembly for a torque converter comprising:

forming a plenum groove in an outer radial surface of a turbine hub;

forming a channel in the turbine hub extending radially from an inner radial surface of the turbine hub to the outer radial surface, the channel being axially aligned with the plenum groove;

providing a first seal on the outer radial surface of the turbine hub on a first axial side of the plenum groove and providing a second seal on the outer radial surface of the turbine hub on a second axial side of the plenum groove; and sliding the turbine hub into a further hub such that the first and second seals contact an inner radial surface of the further hub and a chamber is formed radially between the turbine hub and the further hub and axially between the first and second seals, the plenum groove being defined by a first plenum groove wall extending radially inward from a first outer surface wall, a second plenum groove wall extending radially inward from a second outer surface wall and a third plenum groove wall connecting the first plenum groove wall and the second plenum groove wall by extending axially from the first plenum groove wall to the second plenum groove wall, at least one of the first plenum groove wall and the second plenum groove wall being inclined with respect to a center axis about which the hub assembly is configured to rotate such that the at least one of the first plenum groove wall and the second plenum groove wall extends axially away from the third plenum groove wall, the third plenum groove wall being inclined with respect to the center axis.

14. The method as recited in claim 13 further comprising forming a first seal groove in the outer radial surface of the turbine hub and forming a second seal groove in the outer radial surface of the turbine hub, the first seal being provided in the first seal groove, the second seal being provided in the second seal groove.

15. The method as recited in claim 13 wherein the further hub includes a further hub channel extending from the inner radial surface thereof to an outer radial surface thereof, the further hub channel being aligned for fluid communication with the channel of the turbine hub via the chamber.

\* \* \* \* \*